United States Patent [19]
Reinicke et al.

[11] Patent Number: 6,026,847
[45] Date of Patent: Feb. 22, 2000

[54] MAGNETOSTRICTIVELY ACTUATED VALVE

[76] Inventors: Robert H. Reinicke, 26906 Via Grande, Mission Viejo, Calif. 92691; Derek Tate Schappell, 46 Davenport Pl., Morristown, N.J. 07405; Richard Nassau Molesworth, 41 Brookside Ter., North Caldwell, N.J. 07006

[21] Appl. No.: 08/901,962

[22] Filed: Jul. 29, 1997

Related U.S. Application Data

[63] Continuation-in-part of application No. 08/540,919, Oct. 11, 1995, abandoned.

[51] Int. Cl.[7] .................................................... F16K 31/08
[52] U.S. Cl. .................................. 137/487.5; 251/129.06; 251/129.02
[58] Field of Search .................. 251/129.06, 129.21, 251/129.02, 129.01; 137/486, 487.5

[56] References Cited

U.S. PATENT DOCUMENTS

| | | | |
|---|---|---|---|
| 3,174,716 | 3/1965 | Salter .................................. | 251/129.06 |
| 3,414,010 | 12/1968 | Sparrow . | |
| 3,814,376 | 6/1974 | Reinecke . | |
| 4,298,181 | 11/1981 | Corrado et al. . | |
| 4,695,034 | 9/1987 | Shimizu et al. . | |
| 4,720,077 | 1/1988 | Minours et al. . | |
| 4,750,706 | 6/1988 | Schlagmüller ..................... | 251/129.06 |
| 4,932,439 | 6/1990 | McAuliffe, Jr. . | |
| 5,046,701 | 9/1991 | Barber . | |
| 5,094,430 | 3/1992 | Shirai et al. . | |
| 5,217,037 | 6/1993 | Bristol ............................. | 251/129.06 X |
| 5,222,713 | 6/1993 | Lawless et al. . | |
| 5,267,589 | 12/1993 | Watanabe . | |
| 5,280,773 | 1/1994 | Henkel . | |
| 5,318,064 | 6/1994 | Reinicke . | |
| 5,318,268 | 6/1994 | Cox et al. . | |
| 5,354,032 | 10/1994 | Sims et al. . | |
| 5,375,811 | 12/1994 | Reinecke . | |
| 5,381,817 | 1/1995 | Gassman et al. . | |
| 5,501,425 | 3/1996 | Reinicke et al. ................... | 251/129.15 |
| 5,516,042 | 5/1996 | Gerstengerer . | |
| 5,647,390 | 7/1997 | Wass . | |
| 5,868,373 | 2/1999 | Reinicke et al. ................... | 251/129.21 |

FOREIGN PATENT DOCUMENTS

| | | |
|---|---|---|
| 0 029 129 | 5/1981 | European Pat. Off. . |
| 0 512 521 A1 | 11/1992 | European Pat. Off. . |
| 85/02445 | 6/1985 | WIPO . |
| 95/25920 | 9/1995 | WIPO . |

*Primary Examiner*—Kevin Lee
*Attorney, Agent, or Firm*—Lerner, David, Littenberg, Krumholz & Mentlik, LLP

[57] ABSTRACT

Systems, valves and methods for controlling fluid flow using the systems and the valves for applications involving the control of micro flow of fluids, such as, for example, spacecraft rocket thrusters, oil well production, medical/biological apparatus, industrial apparatus is disclosed. The valves used in the systems and in the methods include a housing having a cavity and an inlet and an outlet. A seat is positioned in the housing and connected to both the inlet and the outlet. A poppet member is positioned in the cavity relative to the seat for controlling fluid flow from the inlet to the outlet. A magnetostrictive member is positioned in the cavity and connected to the poppet member. Electromagnetic excitation means are positioned in the cavity relative to the magnetostrictive member such that current applied to the electromagnetic excitation means controls the position of the poppet relative to the seat. The systems include a controller and associated sensor(s) for measuring any one of a plurality of parameters used to control the micro flow of fluids. A method for controlling fluid flow through the valves is also disclosed.

15 Claims, 2 Drawing Sheets

MAGNETOSTRICTIVELY ACTUATED VALVE

RELATED APPLICATIONS

This is a continuation-in-part of Ser. No. 08/540,919 filed on Oct. 11, 1995, now abandoned, the disclosure of which is hereby incorporated by reference.

BACKGROUND OF THE INVENTION

The invention relates to a valve construction wherein electromagnetic excitation of an elongate magnetostrictive core member is relied upon to actuate a valve for control of fluid flow, as for controlling the flow of a pressurized fluid from an upstream source to an outlet for downstream storage or utilization at reduced pressure.

U.S. Pat. No. 5,501,425 describes several embodiments of magnetostrictive valves of the character indicated, with specific utility and application to spacecraft, wherein the valve is necessarily of normally closed variety and a very high seating force is desired, to provide positive sealing and very low leakage under lock-up (i.e. valve-closed) conditions. Pressurized propellant fluid (gas or liquid) for rocket propulsion maneuvering must be conserved at all costs, relying upon valves with superior (i.e., very low) leakage resistance under lock-up conditions, yet offering fast response to instant demand. Thus, shut-off, isolation, low friction, mechanical simplicity and small size are important considerations in a valve of the character indicated. A magnetically latching and magnetically actuated valve of the nature described in U.S. Pat. No. 3,814,376 or U.S. Pat. No. 5,375,811 has properties approaching the desired low-leakage of a valve-closed condition, but the time constant for valve actuation (opening or closing) is greater than would be desired, the seating force is less than desired and the valve is not capable of modulating control.

It suffices here to note that all of the disclosed embodiments of U.S. Pat. No. 5,501,425 relied upon a central cylindrical core member of magnetostrictive material, forming part of a toroidal path of magnetic flux, wherein the toroidal path surrounds an excitation winding. One axial end of the core member has reference to the valve housing, and the other axial end is poised to drive an actuating stem into abutment with and valve-opening displacement of a valve member which is otherwise spring-loaded into its closed relation of engagement with a valve seat. Helical (coil) or disc spring washers (Belleville springs) are utilized for axial-force preloading and to center moving component parts for minimum friction and/or mechanical hysteresis. Moreover, inlet and outlet ports serve valve-chamber regions at one axial end of magnetostrictive actuating system.

For applications relating to the injection of chemical additives into the wellheads of offshore oil wells, manually adjustable needle valves have been used. However, as offshore oil wells are being installed in deeper water and at greater distances from the offshore platforms that service these wells, utilization of these manually adjustable needle valves is proving to be rather costly. For example, an offshore platform is required to service multiple wells and each well can require up to three chemical additives. The present method of injecting these chemical additives is to run lines from the platform to each well for each chemical to be injected. A pump on the platform is used to pump the additive into the well through the manually adjustable needle valve. Periodically the rate of consumption of the additive is checked and the pump speed is adjusted to flow the additive at the required rate. The disadvantage of this present method is that the cost of installing and maintaining an injection line for each additive per well is quite large, especially since the distances from the platform to multiple wells can be up to seventy (70) miles.

It was recognized that a need existed for a subsea distribution system in which only three lines are run to a point located centrally between a group of wells and then the individual additive lines were run from the centralized distribution point to each well. With this method, the injection of chemical additives into each well must be adjusted by a valve at the centrally located distribution point. The number of valves requiring adjustment is the number of wells being fed from the distribution manifold times the number of injection chemicals.

Currently, manually adjustable needle valves are used to control the rate of the chemical additives being injected by this method. In one prior method when the flow rate for an additive required adjustment, a remotely operated vehicle (ROV) was sent from the platform to the distribution manifold to adjust the adjustable needle valve. This process was at best cumbersome and time consuming.

Given the above described efficiency and cost problems, there has been considerable effort to develop a remotely adjustable valve with the right combination of features as an alternative to the manually adjustable needle valves. One approach was to add a motor actuator to one of the manual valve designs. However, with this approach the valve proved to be quite large and required a considerable amount of power during operation.

Thus, there is a need for a valve in spacecraft, oil well and other applications for controlling micro flows of fluids that has low power consumption, is small and of low weight and has a simple reliable design while having precisely controllable fluid flow rates to the outlet.

SUMMARY OF THE INVENTION

One object of the invention is to provide an improved valve construction of the character indicated.

A specific object is to provide a valve construction having superior lock-up properties of sealing against leakage of pressurized fluid for the valve-closed condition.

Another specific object is to meet the above objects with a basically simple miniaturizable configuration, having application for control of gas stored under high pressure for use in propulsion systems or maneuvering orientation of a spacecraft and/or a satellite.

A further specific object is to meet the above objects with a construction having a fast time constant of valve opening and closing, and exhibiting inherently little mechanical hysteresis, under a wide range of ambient temperature conditions and offering a fail safe condition of superior valve lock-up against leakage of pressurized fluid.

Yet another specific object is to provide a valve for precisely controlling the injection of chemical additives into well heads.

Still a further object is to provide a valve for injecting chemical additives into wellheads that has a low power consumption;

Another specific object is to provide a valve that is relatively small and low in weight.

Another specific object is to provide a valve for controlling the micro flow of fluids for use in oil well production.

Still another specific object is to provide a valve for controlling the micro flow of fluids for use in industrial applications, such as, but not limited to, requiring the metering of micro flow additives or mixture control.

Yet another specific object is to provide a valve for controlling the micro flow of fluids for use in medical/biological applications, such as, but not limited to, delivering fluids to a patient.

Another specific object is to provide a valve having a thermally compensated configuration such that valve operation is not adversely effected by temperature changes.

A further specific object is to provide a valve of modulating control so any intermediate valve position is stably obtained, as well as full open and full closed end positions, in response to the magnitude of the electrical command signal.

It is a general object to meet the above objects with simpler construction offering economies of manufacture without sacrifice of performance capability.

The invention achieves these objects by providing valve constructions which rely upon excitation means, such as, for example, electromagnetic coil driven axial elongation of an annular magnetostrictive core member, for displacement of an elongate poppet-valve member. In one embodiment, a first stiffly compliant preload independently urges the poppet-valve member into its seated position of lock-up at valve closure. A second stiffly compliant preload independently prestresses the annular magnetostrictive core member into a fixed referencing abutment with valve-body structure. This second preload places the magnetostrictive core into a compressive stress to optimize the elongation response of the material. The currently preferred magnetostrictive material is Terfenol-D, which offers a relatively strong elongation response to inductively coupled excitation such as when subject to a magnetic field. The elongation response is sufficient to serve the purposes of (1) closing a pretravel clearance prior to a flange engagement with the poppet-valve member and (2) also, via the flange engagement, displacing the poppet-valve member out of its normal valve-closing engagement with the valve seat. In the preferred spacecraft application embodiments, inlet and outlet ports for the valves are centered at the respective axial ends of the valve-body structure.

In a second preferred embodiment used for applications involving micro flow control of fluids, such as, for example, oil well production, medical/biological apparatus, industrial apparatus, etc., an electrically operated normally-open valve construction comprises a hollow shell member of ferromagnetic material, a housing member having a cavity formed therein and including an inlet and an outlet, a valve member, operatively positioned in the cavity of the housing member, for controlling the flow of fluid from the inlet to the outlet, a magnetostrictive member operatively positioned in the cavity and operatively connected to the valve member, and excitation means, operatively positioned relative to the magnetostrictive member, for causing axial elongation of the magnetostrictive member such that when full current is applied by the excitation means to the magnetostrictive member the valve member is in the closed position.

In a third preferred embodiment used for applications involving micro flow control of fluids, such as, for example, oil well production, medical/biological apparatus, industrial apparatus, spacecraft, etc., an electrically operated normally-open valve construction comprises a hollow shell member of ferromagnetic material, a housing member having a cavity formed therein and including an inlet and an outlet, a valve member, operatively positioned in the cavity of the housing member, for controlling the flow of fluid from the inlet to the outlet, a magnetostrictive member operatively positioned in the cavity and operatively connected to the valve member, and excitation means, operatively positioned relative to the magnetostrictive member, for causing selective axial elongation and contraction of the magnetostrictive member such that when the current applied to the electromagnetic coil by the excitation means, the position of the valve member varies between the open and the closed position.

A preferred method for controlling fluid flow comprises the steps of: providing a housing having a cavity formed therein and including an inlet and an outlet; positioning a seat in the housing; positioning a magnetostrictive member in the housing; positioning an electrical excitation means in the housing in an inductively coupled relationship with the magnetostrictive member; positioning a poppet-valve member in the housing; operatively connecting the poppet-valve member to the magnetostrictive member; positioning compliant means between one end wall of the housing and the poppet valve member; providing ferromagnetic means including portions of the housing for completing with the magnetostrictive member a toroidal flux path enveloping the excitation means for varying the length of the magnetostrictive member; and providing current to excitation means such that the axial length of the magnetostrictive member is correspondingly varied In the present description, for convenience of reference, the central axis of the valve system will be sometimes referred to as "horizontal," extending from a left or inlet-end port, to a right or outlet-end port. But it is to be understood that a "horizontal" orientation is no more significant than the "vertical" orientations shown for the embodiments of U.S. Pat. No. 5,501,425 in that valve operation is not in any sense dependent upon any relation to the gravitational forces.

BRIEF DESCRIPTION OF THE DRAWINGS

Preferred and illustrative embodiments of the invention will be described in detail, in conjunction with the accompanying drawings, in which.

DETAILED DESCRIPTION OF THE PREFERRED EMBODIMENTS

Figure 1:
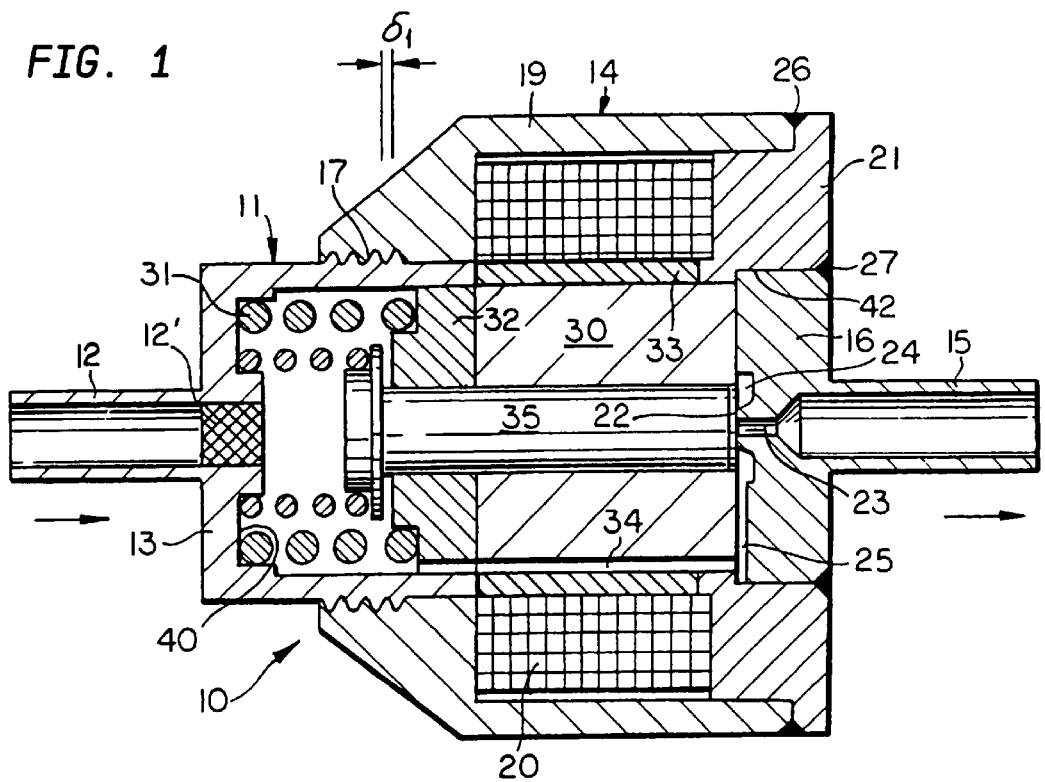
FIG. 1 is a view in longitudinal section of a first valve embodiment of the invention, shown for the closed condition of the valve.
Figure 2:
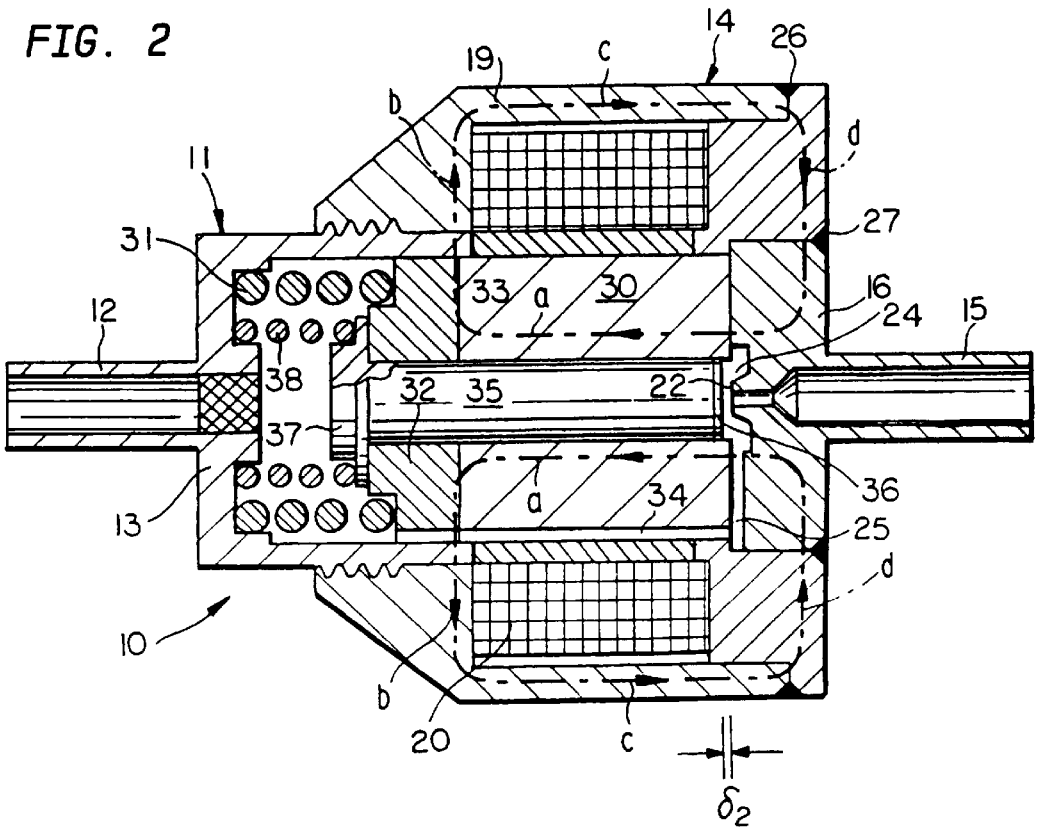
FIG. 2 is a view as in FIG. 1 for an actuated condition of the valve, with schematic indication of the flow of electromagnetically induced excitation flux.

Referring initially to the embodiment of FIGS. 1 and 2, the invention is shown to comprise a body 10, consisting of an upstream cup-shaped part 11 having a central inlet-port connection 12 to its closed left-end wall 13, and annular downstream parts 19, 21, 33, collectively marked 14, and having a central outlet-port connection 15 to a closed right-end wall 16. The body parts 11, 16, 19, 21, 30 and 32 are of ferromagnetic material, and the part 33 is an inner sleeve of a material which is not ferromagnetic. The part 19 is an outer sleeve or skirt portion of body 10 and has an inwardly flanged upstream end which telescopically laps the upstream body part 11; the body parts 11, 19 are shown connected and sealed by a circumferential weldment 17. An inlet filter 12' in port 12 assures that particles borne by inlet pressurized fluid flow will not impair valve operation.

More specifically, the outer sleeve or skirt part 19 of body part 14 features a counterbore for reception and location of an electromagnetic coil winding 20. The inner sleeve 33 provides coaxial support of winding 20, and the downstream annulus 21 closes the counterbore for axial retention of winding 20. The downstream end-wall part 16 seats against the inner end of a counterbore in annulus 21 and is centrally formed at its upstream end with an annular valve-seat configuration, which surrounds a passage to outlet port 15 and which projects from an annular manifolding concavity. One or more radial grooves 25 communicate inlet-gas flow to the manifold 24.

It is important to this embodiment of the invention that the end-closure walls 13, 16 shall be securely connected to withstand internal axially compressional loading of valve parts yet to be described. This can be done by circumferentially welding the fit of parts 19, 21 to each other and by providing a circumferential weld 27 of end-wall part 16 to the annulus 21; however, in the preferred arrangement shown in FIGS. 1 and 2, parts 19, 21 have only an axially extending telescopic fit that is sealed and the material of inner sleeve is selected not only for its non-ferromagnetic properties, but also for its compatibility with the ferromagnetic material of axially adjacent parts 11, 21 for welding purposes. Suitably, the material of ferromagnetic body parts 11, 16, 19, 21, 30 and 32 is magnetic-quality stainless steel (such as 430), and the material of non-magnetic sleeve 33 is an austenitic stainless steel (such as 304L), circumferentially welded at both axial ends, as suggested by thickened lines of connection to parts 11 and 21 in FIGS. 1 and 2. After such welding of sleeve 33, a single continuous bore is defined and is preferably finish-ground after the described welding of sleeve 33 and prior to assembly of internal valve components (yet to be described) and of the downstream end-closure part 16. It will be understood that once these internal valve components have been assembled, and end-closure part 16 has been welded at 27 to annulus 21, the continuously finished bore within welded parts 11, 33, 21 establishes an axially direct continuous permanent interconnection of the end-closure walls at 13 and 16.

In accordance with a feature of the invention, a cylindrical annulus or core 30 of magnetostrictive material is retained, preferably with close clearance, within the continuous bore of parts 11, 33 and 21; and a stiffly compliant spring 31, seated within body part 11, applies prestressing compressional force, via a shouldered plate 32, to the upstream end face of the magnetostrictive annulus 30. The fit of parts 30, 32 to the described continuous bore of parts 11, 33, 21 will be understood to be sufficiently loose, to allow for magnetostrictive elongation of part 30, pursuant to electrical excitation of coil 20. As best seen in FIG. 2, such excitation of coil 20 establishes toroidal circulation of magnetic flux, via inductive coupling to the magnetostrictive part 30 along an inner axial path leg a, with resultant path completion radially outward via a path leg b, an outer axial path leg c, and back to path leg a via a radially inward path leg d.

One or more longitudinal grooves 34 in the periphery of plate 32 and of core 30 align with the one or more radial grooves 25 of body-closure wall 16, to provide for pressurized fluid communication from inlet port 12 to the manifold 24.

An elongate cylindrical poppet-valve member 35 has guided support for limited longitudinal displaceability from its normally closed downstream-end contact with the valve-seat formation 22. Preferably, this downstream end of the valve member is coated or otherwise finished with a closure pad or coating of elastomeric material or a plastic material, such as Nylon or Teflon[1]. And valve member or poppet 35 features a radial-flange formation 37 at its upstream end for shouldered reception of stiffly compliant preloading force, shown to be provided by a coil spring 38 that is nested within the prestressing spring 31 and independently referenced to the body-closure wall 13.

[1] A trademark of the DuPont Company.

The normally closed valve condition of FIG. 1 reveals, with some exaggeration, an axial clearance or pretravel allowance $\delta_1$, to assure the independent action of spring 38, for fail-safe closure of poppet end 36 against the annular rim of seat 22. This pretravel allowance must be overcome by magnetostrictive elongation of core magnetostrictive member 30, in response to a sufficient electrical excitation of winding 20, before the magnetostrictive elongation can further be expected to lift the poppet-valve element 30 into a valve-opening axial clearance $\delta_2$ from seat 22. Thus, the total elongation of element 30 is the sum of $\delta_1$, and $\delta_2$; but, for the indicated usage in spacecraft applications, the values of these axial clearances are, small usually just a few micrometers (microns), in view of very small flow rates of zero (0) to about seventy-three (73) mg/sec, for the case of Xenon gas as the pressurized fluid. With proper choice of materials and associated geometry, the extent of pretravel clearance (i.e. thermal-stroke error) can be reduced to near-zero, in view of the fact that in use, the stem of the poppet-valve member 35 and the magnetostrictive core member 30 will be at essentially the same steady-state temperature. At present, a preference is stated for use of a magnetostrictive material known as Terfenol-D as the material of core magnetostrictive member 30; this is a specially formulated alloy of terbium, dysprosium and iron with operating condition specific stoichiometry, and it is commercially available from Etrema Products, Inc., of Ames, Iowa. Preferably, the material of poppet-valve member 35 has substantially the same temperature coefficient of expansion as the material of core magnetostrictive member 30; and for the indicated use of Terfenol-D, the desired substantial match of thermal coefficients results from use of the titanium alloy Ti-6Al-4V or the nickel alloy Inconel 722 as the material of valve member 35, thereby effectively neutralizing the effects of differential thermal expansion of parts 30, 35 and when all materials and lengths are considered, and reducing allowance for pretravel $\delta_1$ to near-zero.

As with ferromagnetic body parts 11, 14, 19, 21, 16, plate 32 is also suitably of magnetic-quality stainless steel. And the bore of plate 32 may have a coating of Teflon or other low-friction material for smooth axially slidable displaceability with respect to the upstream (i.e. flanged) end of poppet 30. Winding 20 may be itself a sub-assembly, pre-potted in a suitable potting compound and defining a solid cylindrical annulus, with precisely spaced end-wall surfaces, and with a bore having a closely supporting fit to the non-magnetic sleeve 33.

In the description thus far, it will be appreciated that the reference to body parts 11 and 14, as being telescopically or otherwise fitted shapes, has been for convenience purposes, in that the main point is that the magnetostrictive core member 30 shall be the axially extending portion of the toroidal flux path established via the body parts, upon excitation of the winding 20 which is enclosed within the toroidal flux path.

The described constructions will be seen to meet all stated objects and to provide a simplified collocation of elemental parts which lend themselves to facile assembly and reliable performance. In particular, all necessary clearances and preloads are automatically achieved for the method of assembly which has been described, and no further adjustments are needed. It is particularly notable that the two independently operative springs are in nested radial clearance with each other; that they each derive compressive reference from the single end-closure wall 13; and that the other closure wall 16 of the body or housing 11, 14 provides reactive reference for the prestressed core member 30 and for the valve-seat formation 22, in the normally closed condition of the valve. When winding 20 is sufficiently excited, magnetostrictive elongation of core member 30 is a lifting action wherein core member 30 has axial-abutment reference to the said other closure wall 16; the lifting action opens the valve by axially lifting the poppet 35 upon core member 30 engagement with the flanged end of the poppet, against the preloading force of spring 38.

The above embodiments were directed to a valve for a specific application requiring a normally closed valve. The following description will be directed toward a valve in a normally open position including the feature of modulating the current for the excitation to vary the position of the poppet relative to the outlet such that the amount and/or the flow rate of the fluid exiting the valve can be controlled. Such valves are useful in medical/biological devices for delivering fluids to a patient, in industrial devices requiring the metering of micro flow additives or mixture control or in other applications as will be appreciated by those skilled in the art.

Figure 3:
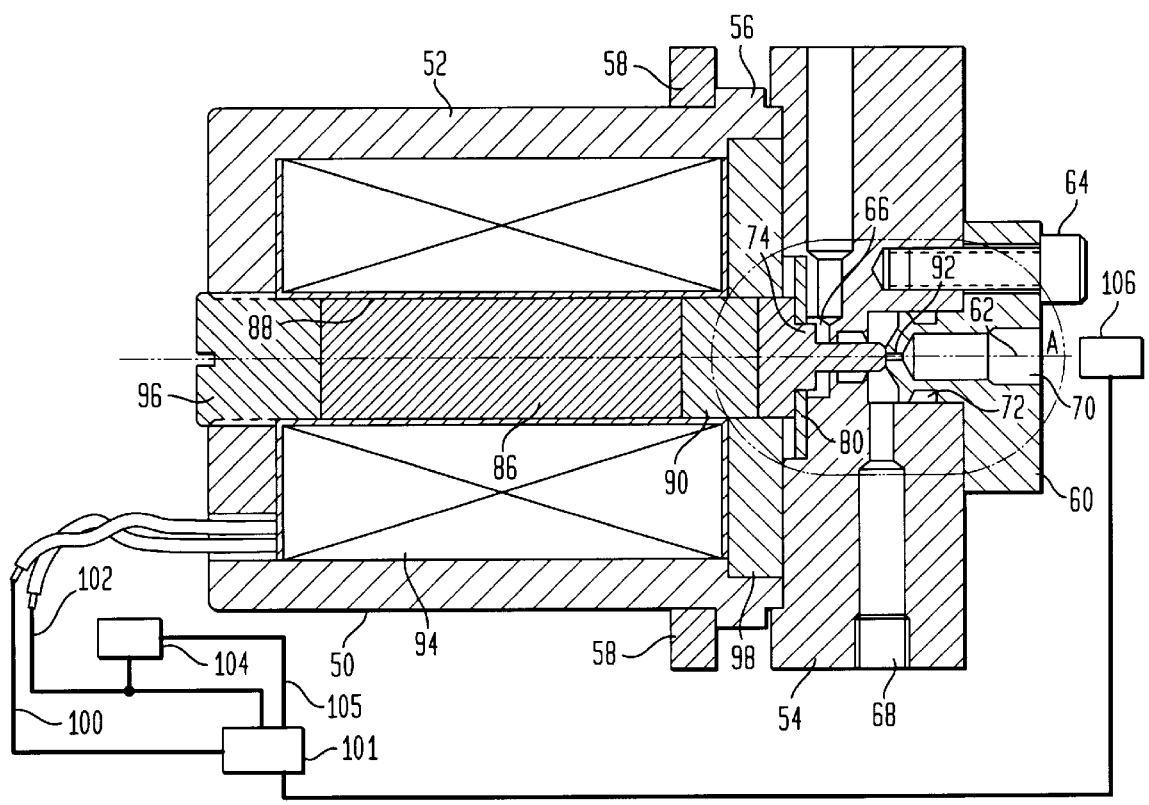
FIG. 3 is a view in longitudinal section of another embodiment of the invention, shown for the open condition of the valve.
Figure 4:
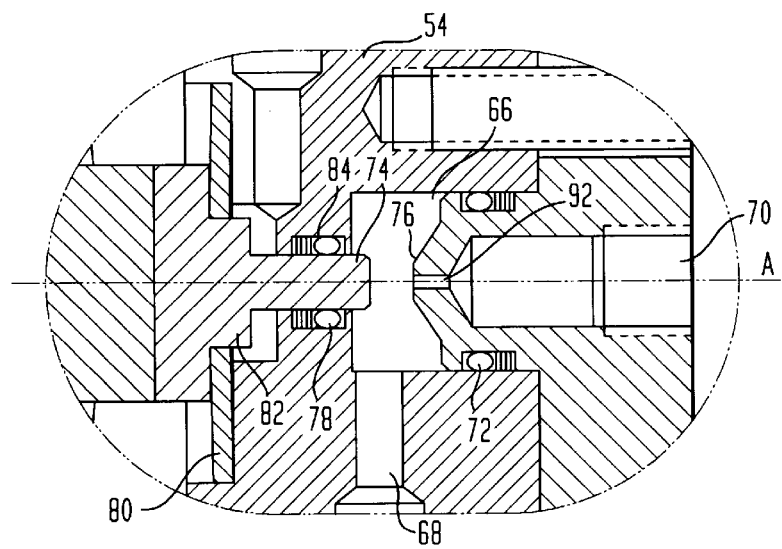
FIG. 4 is an enlarged view of the valve seat of the embodiment of FIG. 3.

Referring now to the embodiment of the valve 48 of FIGS. 3 and 4, the valve 48 is shown to comprise a housing 50 consisting of an upper cup-shaped shell 52 and a lower body 54, concentric with a central axis A, to define an internal cavity volume therebetween. The skirt portion 56 of the shell 52 is operatively connected to the body 54 and is engaged by hold down flange 58 for sealed retention of the engagement.

A circular seat member or seal insert 60 has a central opening 62 about axis A and is shown located by a plurality of screws 64 in the body 54. A chamber 66 is served by an inlet port 68 and an outlet port 70. Screws secure seat member 60 to body 54, and an elastomeric seal ring 72 prevents pressurized fluid flow from the outlet port 70 to ambient. The poppet-valve member 74 and seat member 60 are preferably of a hard material, such as, for example, tungsten carbide, stellite 6, 17-4 PH or nitronic 60, and their flat-to-flat engagement for the closed condition preferably involves lap-ground surfaces.

The poppet-valve member 74 is shown with a cylindrical surface for self-aligning support in a bore 78 in the valve body 54. A compliant means or spring washer 80 is positioned between the body 54 and the poppet 74 such that there is a degree of clearance between the flange 82 of the poppet 74 and the matching flange 84 of the body 54.

An elongate rod or member 86 of magnetostrictive material, currently preferably, Terfenol-D, is positioned within a bore 88 in the shell 52 in concentric relation to axis A. At its lower end, member 86 abuts an actuation spacer 90 which is positioned in the bore 88 of the shell 52. The actuation spacer 90 abuts the poppet 74 and also is at least partially positioned in the shell bore 88. The poppet 74 extends with radial clearance into the bore 78 in the body 54 to a point which in the valve 48 closed condition, the tip of the poppet contacts the bore 92 in the seat 60. An adjusting screw 96 positions the member 86 against the actuating spacer 90 and the poppet 74.

At the upper end of the bore 88, the diameter of the magnetostrictive rod establishes, with the cylindrical inner wall surface of the shell 52, an annular space which accommodates a solenoid or excitation winding 94 which, when excited, is inductively coupled to the magnetostrictive member 86. More specifically, winding 94 is suitably a coil of predetermined electrical capacity, conventionally wound upon a bobbin or other conventional carrier of non-magnetic material, such as, for example, plastic-consolidated fiber or cardboard, and having an elongate central bore which establishes radial clearance with the core member 86.

The material of the shell 52 adjusting screw 96, and actuating spacer 90 mounted therein, is ferromagnetic, such as, for example, a magnetic-quality stainless steel, thus establishing with member 86 a toroidal path of magnetic-flux flow, subject to electrical excitation of the winding, which is the situation depicted in FIG. 3. The body 52 is not relied upon for any path of magnetic flux, but its material is preferably of stainless steel, without the requirement for magnetic quality. The magnetostrictive material of member 86 is preferably although not necessarily Terfenol-D, a specially formulated alloy of terbium, dysprosium and iron, and it is commercially available from Etrema Products, Inc., of Ames, Iowa.

For the indicated application of valves of presently described nature, flow rates for pressurized fluids are low ( about 0.0007 gpm to about 0.36 gpm) and, therefore, required axial displacements in response to magnetostrictive-core excitation are relatively small (0.002 inch maximum), e.g., flow rates of about 0.0008 to about 0.3 gallon per minute (gpm) for the case of oil well chemical additives. The axial magnetostrictive stroke to achieve a maximum-flow of this magnitude is about 0.002 inch, for the case of a seat diameter of about 0.030 inch.

The axial displacement is readily achieved for a coil winding of about 6900 turns of 26.5 AWG enamel-coated copper wire and a maximum excitation current of about 0.3 amps at about 30 volts.

In a normally open valve, when the valve 48 is assembled, it is adjusted so that at maximum current to the coils 94, the poppet 74 forms a leak tight seal against the seat bore 92. This leak tight seal is accomplished by supplying the maximum current value to the coil 94 while turning in the adjusting screw 96 until a pressure source at the inlet 68 is isolated from the outlet 70. When the current to the coil 94 is removed, the magnetostrictive member 86 will contract back to its original length allowing the spring washer 80 to lift the poppet 74 off of the seat bore 92, thus allowing fluid to flow from the inlet 68 to the outlet 70.

As mentioned above, the shell 52, the adjustable screw 96, the flux washer 98 and the actuating spacer 90 are all made from magnetic material in order to force the field generated by the coil 94 to pass through the magnetostrictive member 86. If the current to the coils 94 varied from zero (0) to the maximum value, the position of the poppet 74 will vary from full open to full closed. By supplying a constant intermediate current to the coils 94, the valve 48 will stay at a stable constant equivalent orifice or a selected intermediate position between full open and full closed.

While in one stable constant equivalent orifice position, if a lower fluid flow rate is desired, the current supplied to the coil 94 can be increased to reduce the valve's equivalent orifice, i.e., move the poppet 74 further toward the flat surface 76 of the valve seat bore 92, or decreased to increase the valves equivalent orifice, i.e., move the poppet 74 further away from the flat surface 76 of the valve seat bore 92.

The valve of the present invention, as described above, as well as the previous spacecraft embodiments, can also be used in a closed loop system where the current supplied to the valve by line 100, 102, is varied by a controller 104 that uses feedback through line 105 from any one of a plurality of possible parameters that might be desirable to measure, such as, for example, by a flowmeter, a pressure sensor, a temperature sensor or a pressure sensor 101 in combination with a fixed orifice or capillary 106 operatively positioned downstream of the valve to maintain a commanded condition, as is known to those skilled in the art.

Using the aforedescribed embodiments, including a magnetostrictive member, for oil well and spacecraft applications, the valve poppet position and thus, flow, is stable and predictable. Hence, the valve of the present invention provides high output force in a relatively compact valve package. With the embodiment described above, power consumption is extremely low as compared to the prior art and there is believed to be little, if any, hysteresis. Other advantages include, but are not limited, to reduced maintenance and down time for applications for controlling micro flow, such as, for example, in the chemical, petrochemical and medical/biological fields or any application requiring a variable, yet stable poppet position and, thus, resulting in a controllable fixed orifice diameter or cross-sectional area.

The valve of the present invention that includes a magnetostrictive member as the valve actuator provides variable resistance to flow by positioning a poppet at any one of a plurality of possible positions above a seat. The position of the poppet relative to the seat varies when the current supplied to the coil is varied and thus the flow rate through the outlet is varied. One key to the success of the present invention is the ability of the combination to establish, on command from a controller, such as, for example, a computer, any one of a plurality of possible fixed orifices. Forces on the poppet may vary but the valve position will not vary from the desired or commanded position relative the seat resulting in a controllable fixed orifice.

In operation, the inlet 68 of the valve 48 is connected to a high pressurized fluid source, such as, for example, a chemical additive or a pressurized propellant gas. The outlet 70 of the valve 48 is connected to, for example, an oil well (not shown), a spacecraft propulsion device, for maneuvering the spacecraft, a medical/biological device for delivering fluids to a patient, an industrial device requiring the metering of micro flow additives or mixture control or other applications as will be appreciated by those skilled in the art. When current is provided to the coils 94, the magnetostrictive member 86 expands in length as the magnetic force is passed therethrough. As has been described earlier, the relationship between the magnetic field and the magnitude of the growth in length of the member 86 is well defined.

Thus, in one application, with no current being provided to the coil, the poppet is in its full extracted position and the maximum amount of fluid can enter through the inlet and exit through the outlet. As the current to the coils is increased, in response to a command from a controller, the command being generated upon the sensing of any one of a plurality of different measurable parameters, the poppet moves closer to the seat thus reducing the amount of fluid exiting the outlet and controlling the flow of fluid through the valve.

Thus, in another application, with no current being provided to the coil, the poppet is in its full closed position preventing fluid from entering through the inlet and exiting through the outlet. As the current to the coils is increased in response to a command from a controller, the command being generated upon the sensing of any one of a plurality of different measurable parameters, the poppet moves away from the seat thus gradually increasing the size of the orifice and controlling the flow of fluid through the valve.

While the present invention has been described with respect to spacecraft and oil well production applications, the basic concepts are clearly applicable to any application requiring the remote metering of various fluids including, but not limited to, fluid chemicals, as would be apparent to those skilled in the art. Specifically, the present invention could be used for controlling the remote micro metering of fluids in, but not limited to, the chemical, petrochemical and medical/biological fields.

It should be understood that, while the primary description above is directed to the innovative construction of a valve using a magnetostrictive material, it is intended that the complete system including, but not limited to a controller, such as, for example, a computer and associated sensors for measuring any one of a plurality of possible parameters are used when controlling the size of the valve orifice to obtain the commanded stable constant equivalent orifice. Such controllers and sensors will be application specific and would be known to those skilled in the art.

Changes and modifications in these specifically described embodiments can be carried out without departing from the scope of the invention that is intended to be limited only by the scope of the appended claims.

What is claimed is:

1. A valve comprising a valve housing including a cavity, an inlet port and an outlet port, a valve seat associated with one of said inlet and outlet ports, a poppet positioned within said cavity for selectively moving between a first position in contact with said valve seat whereby said one of said inlet and outlet ports is closed and a second position displaced from said valve seat whereby said one of said inlet and outlet ports is open, a spring member for actively prestressing said poppet into one of said first and second positions, an actuator having a first end and a second end defining a predetermined length therebetween, excitation means for exciting said actuator and causing said predetermined length of said actuator to increase, thereby increasing the distance between said first and second ends of said actuator, said second end of said actuator being operatively associated with said poppet whereby the current applied to said excitation means controls the degree to which said second end of said actuator causes said poppet to overcome the active prestressing of said spring member and controls the position of said poppet relative to said valve seat, and control means for varying the current supplied to said excitation means.

2. The valve of claim 1 wherein said valve housing comprises a hollow shell of ferromagnetic material; and a unitary body comprising said inlet, said outlet and said valve seat.

3. The valve of claim 1 further comprising:
   temperature measuring means, operatively connected to said control means, for measuring the temperature at a predetermined location, whereby said current supplied by said control means to said excitation means is varied thereby.

4. The valve of claim 1 further comprising:
   pressure measuring means, operatively connected to said control means, for measuring pressure at a predetermined location, whereby said current supplied by said control means to said excitation means is varied thereby.

5. The valve of claim 1 further comprising:
   flow rate measuring means, operative connected to said control means, for measuring the fluid flow rate through said valve, whereby said current supplied to said control means to said excitation means is varied thereby.

6. The valve of claim 5 wherein the flow rate measuring means comprises:
   a flowmeter.

7. The valve of claim 5 wherein the flow rate measuring means comprises:
   an orifice or capillary operatively positioned in series with said valve; and
   a pressure sensor operatively positioned relative said orifice or capillary.

8. The valve of claim 5 wherein when said flow rate measuring means is used to measure the mass flow rate, the flow rate measuring means comprises:
   an orifice or capillary operatively positioned in series with said valve; and
   a pressure sensor and a temperature sensor operatively positioned relative said orifice or capillary.

9. The valve of claim 1 further comprising:
   at least one sensor, operatively connected to said control means, for measuring at least one of a plurality of parameters, whereby said current supplied by said control means to said excitation means is varied thereby.

10. The valve of claim 1 wherein, when the current to said excitation means is varied from zero to the maximum current, the position of the poppet varies from full open to full closed.

11. The valve of claim 1 wherein, when the current to said excitation means is varied from zero to the maximum current, the position of said poppet varies from full closed to full open.

12. The valve of claim 1 wherein said spring actively prestresses said poppet into said second position.

13. The valve of claim 1 wherein said actuator and said poppet are aligned in series having a common axis.

14. The valve of claim 1 wherein said valve seat is associated with said outlet port and said spring actively prestresses said poppet into said second position.

15. The valve of claim 1 wherein said actuator comprises a magnetostrictive material.

* * * * *

UNITED STATES PATENT AND TRADEMARK OFFICE
CERTIFICATE OF CORRECTION

PATENT NO. : 6,026,847
DATED : February 22, 2000
INVENTOR(S) : Reinicke et al.

It is certified that error appears in the above-identified patent and that said Letters Patent is hereby corrected as shown below:

Column 1, line 51, after "of" insert --the--
Column 4, line 6, after "current" insert --is--.
Column 4, line 26, after "varied" insert --.--.
Column 6, line 11, before "A" insert --$^1$--.
Column 7, line 64, cancel "in" and insert therefor --, with--.
Column 7, line 64, after "48" insert --in a--.
Column 9, line 3, "line" should read --lines--.
Column 9, line 19, "limited, to" should read --limited to,--.
Column 10, line 66, "operative" should read --operatively--.
Column 12, line 13, after "spring" insert --member--.
Column 12, line 18, after "spring" insert --member--.

Signed and Sealed this

Twenty-seventh Day of February, 2001

NICHOLAS P. GODICI

*Attest:*

*Attesting Officer*   *Acting Director of the United States Patent and Trademark Office*